June 23, 1959  J. PELES  2,891,507
BIRD FEEDING TRAY
Filed Jan. 7, 1957
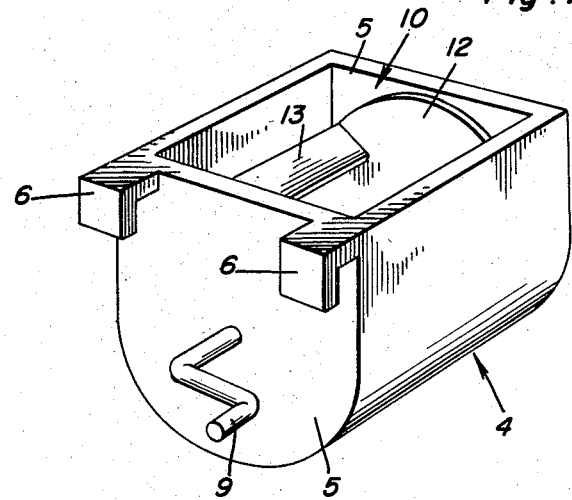
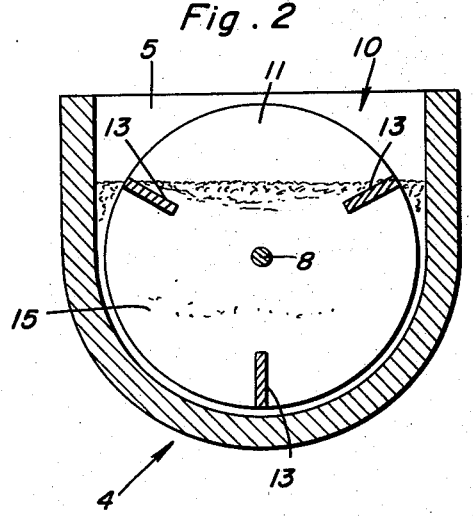 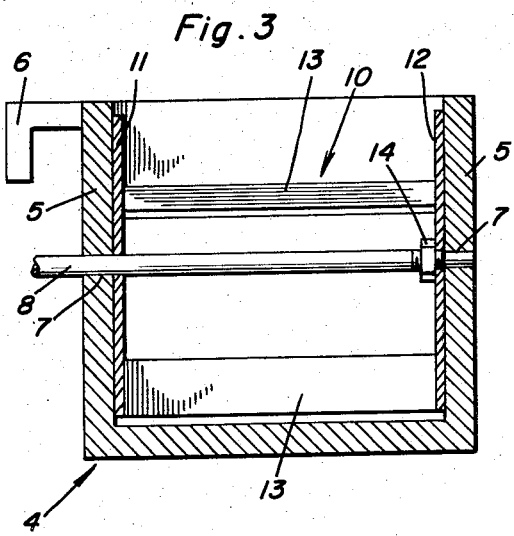
Joseph Peles
INVENTOR.

United States Patent Office 2,891,507
Patented June 23, 1959

2,891,507
BIRD FEEDING TRAY
Joseph Peles, Richmond, Calif.

Application January 7, 1957, Serial No. 632,776

1 Claim. (Cl. 119—18)

The present invention relates to new and useful improvements in bird feeding trays particularly for parakeets.

It is a matter of common knowledge that parakeets, when eating seed, consume only the kernels, returning the hulls to the tray. As a consequence, the seed remaining in the tray soon becomes covered with hulls and is concealed from the birds. When this occurs the tray is usually removed from the cage, emptied, refilled with fresh feed and replaced, resulting in considerable waste. It is accordingly the primary object of the present invention to provide, in a manner as hereinafter set forth, a bird feeding tray comprising novel means, operable from the exterior of the cage, for agitating or mixing the feed at intervals as may be necessary to bring the seed to the surface to be taken by the birds.

Other objects of the invention are to provide a bird feeding tray of the aforementioned character which will be comparatively simple in construction, strong, durable, compact, of light weight and which may be manufactured at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of a bird feeding tray constructed in accordance with the present invention;

Figure 2 is a view in transverse section through the device; and

Figure 3 is a longitudinal sectional view with the crank omitted.

Referring now to the drawing in detail, it will be seen that the embodiment of the invention which has been illustrated comprises a trough of suitable material which is designated generally by reference character 4. As shown to advantage in Figure 2 of the drawing, the trough 4, which may be of any desired dimensions, is substantially U-shaped in transverse section. The trough 4 which is open at its top, comprises flat end walls 5. Formed integrally with the trough 4 on one end 5 thereof and projecting longitudinally from the top portion of said trough is a pair of hooks 6. The hooks 6 are downturned and engageable through a wall of the usual cage for removably mounting the trough 4 therein.

Journaled in openings 7 provided therefor in the end walls 5 of the trough 4 is a shaft 8. At the end thereof which is adjacent the mounting hooks 6, the shaft 8 terminates in an operating crank 9 which is adapted to project through the cage for actuation from the exterior of said cage. Fixed on the shaft 8 for operation in the trough 4 is an agitator or mixer which is designated generally by reference character 10.

The agitator 10 includes a pair of end disks 11 and 12 having mounted therebetween a plurality of radial blades or bars 13. Fixed centrally on the disk 12, which is remote from the operating crank 9, is a nut 14 through which the adjacent end portion of the shaft 8 is threaded.

It is thought that the use of the feeder will be readily apparent from a consideration of the foregoing. Briefly, through the medium of the hooks 6, the trough 4, with the feed therein as indicated at 15, is mounted in the cage on a wall thereof with the operating crank 9 protruding therethrough. The birds, taking the feed 15, may perch on the upper edges of the trough 4 in an obvious manner. Should the feed in the trough become covered with hulls or substantially so, the agitator 10 is actuated through the medium of the crank 9 for thoroughly and expeditiously mixing the hulls and the seed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A bird feeding tray comprising a stationary U-shaped feed containing trough having flat vertical end walls and flat vertical parallel sides, said ends walls having centrally aligned openings therein, an agitator in said trough for said feed comprising a pair of end disks having axial openings therein, agitator bars extending endwise between and fixed to said disks radially thereof with outer longitudinal edges flush with the edges of the disks and inner longitudinal edges spaced from the axis of the disks to provide for feed passing between said bars, an operating shaft for said agitator journalled in the openings in the end walls and passing through the openings in the disks and having a nut threaded thereon and fixed to one of the disks to operatively connect the shaft to said agitator.

References Cited in the file of this patent
UNITED STATES PATENTS

| | | |
|---|---|---|
| 81,716 | Watts | Sept. 1, 1868 |
| 589,152 | Baker | Aug. 31, 1897 |
| 1,359,634 | Thibault | Nov. 23, 1920 |
| 1,864,230 | Busch | June 21, 1932 |
| 2,566,899 | Mangieri | Sept. 4, 1951 |